United States Patent
Ishino et al.

(10) Patent No.: US 10,218,012 B2
(45) Date of Patent: Feb. 26, 2019

(54) SOLID OXIDE FUEL CELL SYSTEM INCLUDING HEAT EXCHANGER DISPOSED OF EXHAUST-GAS AND LOOP CIRCULATION PATHS

(71) Applicant: Panasonic Intellectual Property Management Co., Ltd., Osaka (JP)

(72) Inventors: Hisanori Ishino, Kyoto (JP); Yoshio Tamura, Hyogo (JP); Akinori Yukimasa, Osaka (JP); Junji Morita, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 149 days.

(21) Appl. No.: 15/156,334

(22) Filed: May 17, 2016

(65) Prior Publication Data

US 2016/0344045 A1 Nov. 24, 2016

(30) Foreign Application Priority Data

May 22, 2015 (JP) .................... 2015-104269

(51) Int. Cl.
*H01M 8/04007* (2016.01)
*H01M 8/0612* (2016.01)
(Continued)

(52) U.S. Cl.
CPC ... *H01M 8/04067* (2013.01); *H01M 8/04007* (2013.01); *H01M 8/04029* (2013.01);
(Continued)

(58) Field of Classification Search
None
See application file for complete search history.

(56) References Cited

U.S. PATENT DOCUMENTS

| 2009/0181271 A1 | 7/2009 | Yasuda et al. |
| 2013/0052550 A1 | 2/2013 | Mizuno et al. |

(Continued)

FOREIGN PATENT DOCUMENTS

| EP | 2452917 | 5/2012 |
| JP | 2004-342345 A | 12/2004 |

(Continued)

OTHER PUBLICATIONS

The Extended European Search Report dated Aug. 11, 2016 for the related European Patent Application No. 16169345.2.

*Primary Examiner* — Lucas J. O'Donnell
(74) *Attorney, Agent, or Firm* — McDermott Will & Emery LLP

(57) ABSTRACT

A solid oxide fuel cell system includes a solid oxide fuel cell that produces electricity by using a hydrogen-containing gas and an oxidant gas, an exhaust-gas path via which an exhaust gas discharged from the solid oxide fuel cell flows, a circulation path via which a coolant circulates, a first heat exchanger that is disposed on the exhaust-gas path and the circulation path and enables heat exchange between the exhaust gas and the coolant, a second path, via which condensed water produced when the exhaust gas is cooled in the first heat exchanger flows, that branches from the exhaust-gas path and is connected to the circulation path, a second tank that stores reservoir water, and a second heat exchanger that is disposed in the second tank and on the circulation path and enables heat exchange between the reservoir water and the coolant.

9 Claims, 4 Drawing Sheets

(51) Int. Cl.
*H01M 8/04119* (2016.01)
*H01M 8/1231* (2016.01)
*H01M 8/04029* (2016.01)
*H01M 8/124* (2016.01)

(52) U.S. Cl.
CPC ..... *H01M 8/04164* (2013.01); *H01M 8/0618* (2013.01); *H01M 8/1231* (2016.02); *H01M 2008/1293* (2013.01)

(56) References Cited

U.S. PATENT DOCUMENTS

2014/0193727 A1* 7/2014 Ogawa .............. H01M 8/04007
429/414
2015/0118589 A1* 4/2015 Maruyama ........ H01M 8/04022
429/423

FOREIGN PATENT DOCUMENTS

| | | | |
|---|---|---|---|
| JP | 2010-238473 | | 10/2010 |
| JP | 2013-105612 A | | 5/2013 |
| KR | 10200900885321 | * | 8/2010 |
| WO | 2013/035607 | | 3/2013 |

* cited by examiner

SOLID OXIDE FUEL CELL SYSTEM INCLUDING HEAT EXCHANGER DISPOSED OF EXHAUST-GAS AND LOOP CIRCULATION PATHS

BACKGROUND

1. Technical Field

The present disclosure relates to a solid oxide fuel cell system.

2. Description of the Related Art

An exemplary fuel cell system regarded as a conventional fuel cell system is disclosed in Japanese Patent No. 5381239. In this fuel cell system, a first heat exchanger exchanges heat between flue gas from a fuel cell module and reservoir water from a storage tank. The reservoir water is thus heated by the flue gas and supplied to a drainage system through a circulation line and a drainpipe. The flue gas, on the other hand, is cooled by the reservoir water, so that steam contained in the flue gas is condensed. The condensed water is supplied to a demineralizer through a supply pipe. The demineralized water is supplied to a fuel cell module as reforming water.

SUMMARY

However, there is still room to improve the fuel cell system disclosed in Japanese Patent No. 5381239 from the perspective of heat-exchange efficiency, cost, and size. One non-limiting and exemplary embodiment provides a method for operating a solid oxide fuel cell system that can reduce both the cost and the size while preventing a reduction in the heat-exchange efficiency.

In one general aspect, the techniques disclosed here feature a solid oxide fuel cell system including a solid oxide fuel cell that produces electricity by using a hydrogen-containing gas and an oxidant gas, an exhaust-gas path via which an exhaust gas discharged from the solid oxide fuel cell flows, a circulation path via which a coolant circulates, a first heat exchanger that is disposed on the exhaust-gas path and the circulation path and enables heat exchange between the exhaust gas and the coolant, a first tank that is disposed on the circulation path and stores, as the coolant, condensed water produced when the exhaust gas is cooled by the coolant in the first heat exchanger, and a second heat exchanger that is disposed so as to enable heat exchange between the coolant and reservoir water.

The present disclosure enables the solid oxide fuel cell system to reduce both the cost and the size while preventing a reduction in the heat-exchange efficiency.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
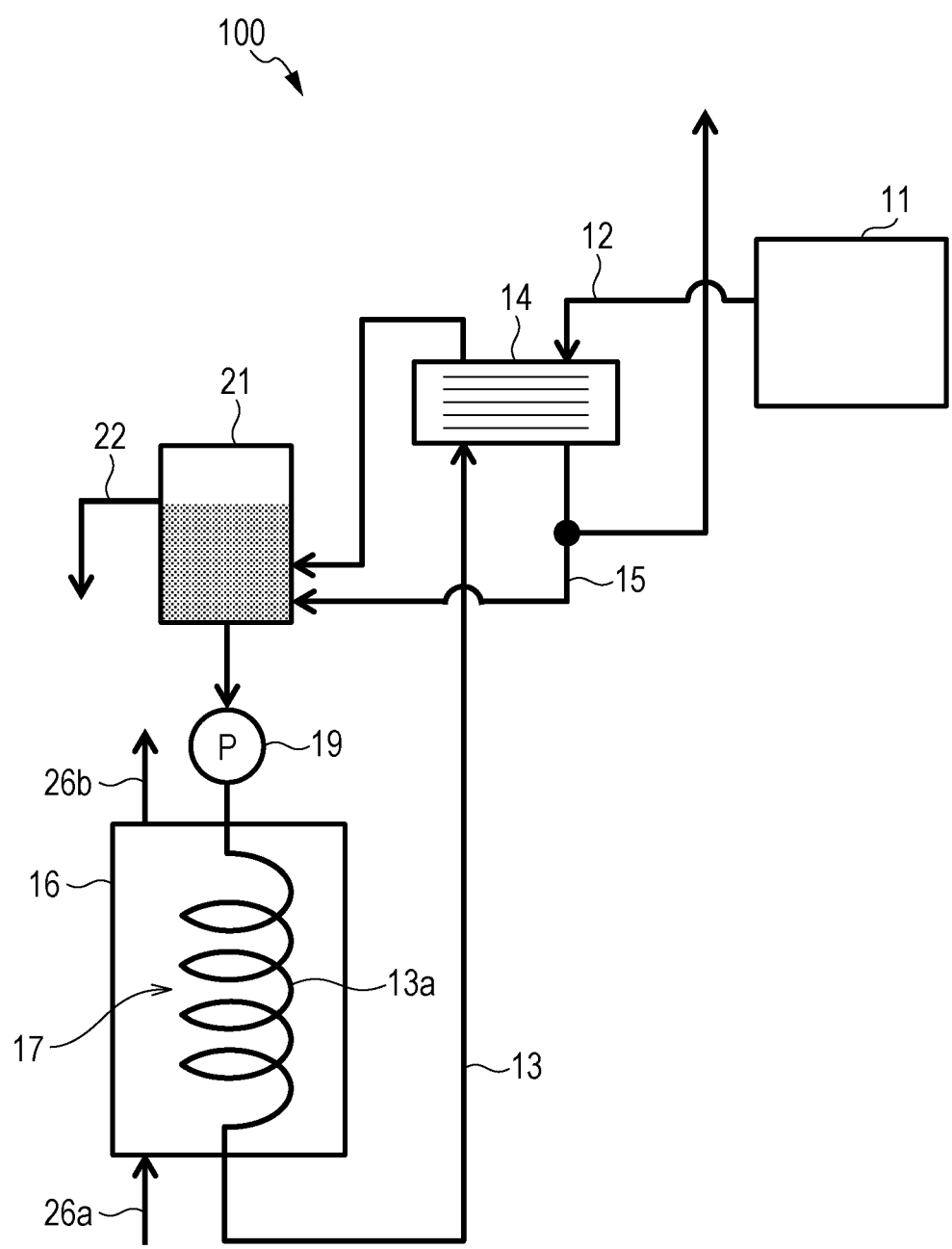
FIG. 1 is a schematic diagram of the structure of a solid oxide fuel cell system according to a first embodiment.

Underlying Knowledge Forming Basis of the Present Disclosure

The present inventors have studied solid oxide fuel cell systems in order to reduce both the cost and the size while preventing a reduction in the heat-exchange efficiency. The present inventors have consequently uncovered the following problem in the related art.

In the fuel cell system in Japanese Patent No. 5381239, tap water is used as reservoir water, and the tap water is heated by heat exchange with a flue gas. Tap water typically contains metal ions such as calcium ions or magnesium ions. The temperature of the flue gas from the solid oxide fuel cell system is very high, and accordingly, heating of the tap water by the flue gas facilitates the formation of metal oxides (scale) from the metal ions in the tap water. The scale that accumulates on the heat exchanger and the circulation line reduces the heat-exchange efficiency. When a pipe to which scale does not readily attach, for example, is used to solve this problem, the cost of the system increases.

The circulation line, through which the reservoir water flows, is arranged separately from the supply pipe, through which the reforming water flows. This arrangement needs separated pipes to be prepared and leads to an increase in the size and the cost of the system.

As a result of diligent study, a circulation path via which a coolant is caused to circulate as a heating medium is provided. On the circulation path, waste heat is collected from the flue gas through a first heat exchanger, so that the temperature of the heating medium is increased and the flue gas is cooled. The waste heat is transferred to reservoir water through a second heat exchanger, and the heating medium is cooled by the reservoir water so that the temperature of the heating medium is decreased. Condensed water separated from the cooled flue gas is used as the heating medium. In this way, a reduction in the heat-exchange efficiency can be suppressed, and the cost and the size can be reduced. The present inventors have made these findings. The present disclosure has been made on the basis of the underlying knowledge and provides a solid oxide fuel cell system that can reduce both the cost and the size while preventing a reduction in the heat-exchange efficiency.

Embodiments

A solid oxide fuel cell system according to a first aspect of the present disclosure includes a solid oxide fuel cell that produces electricity by using a hydrogen-containing gas and an oxidant gas, an exhaust-gas path via which an exhaust gas discharged from the solid oxide fuel cell flows, a circulation path via which a coolant circulates, a first heat exchanger that is disposed on the exhaust-gas path and the circulation path and enables heat exchange between the exhaust gas and the coolant, a first tank that is disposed on the circulation path and stores, as the coolant, condensed water produced when the exhaust gas is cooled by the coolant in the first heat exchanger, and a second heat exchanger that is disposed so as to enable heat exchange between the coolant and reservoir water.

With this structure, the reservoir water composed mainly of tap water is not used as the coolant, which exchanges heat with the exhaust gas in the first heat exchanger. Accordingly, scale due to metal ions contained in the tap water is not created, even when the coolant is heated by the heat exchange. Consequently, in the first heat exchanger, a reduction in the heat-exchange efficiency due to the scale can be prevented, and there is no need for an expensive component that prevents the attachment of scale, thereby an increase in cost can be suppressed.

According to a second aspect of the present disclosure, the solid oxide fuel cell system according to the first aspect may further include a reformer that produces the hydrogen-containing gas by using a source and reforming water, and a first path via which the coolant flows, as the reforming water, into the reformer. The first path may branch from the circulation path at a junction.

With this structure, a path via which the coolant flows from the first tank to the junction is shared between the circulation path and the first path, and the size and the cost can thereby be reduced.

According to a third aspect of the present disclosure, the solid oxide fuel cell system according to the second aspect may further include a first pump that is disposed on the circulation path and circulates the coolant, and a second pump that is disposed on the first path and adjusts a flow rate of the reforming water to cause the reforming water to flow into the reformer. With this structure, the flow rate of the reforming water supplied to the reformer via the first path can be appropriately adjusted by the second pump, for example, in accordance with an S/C ratio.

According to a fourth aspect of the present disclosure, in the solid oxide fuel cell system according to the second aspect or the third aspect, the junction may be situated on the circulation path at a location upstream of the first heat exchanger and downstream of the second heat exchanger. With this structure, a low-temperature coolant, before being heated in the first heat exchanger and after being cooled in the second heat exchanger, enters the first path from the junction. It is accordingly unnecessary to use an expensive pump having heat resistance as the second pump, thereby an increase in cost can be prevented.

According to a fifth aspect of the present disclosure, in the solid oxide fuel cell system according to the fourth aspect, the first heat exchanger, the first tank, the second heat exchanger, and the junction may be arranged in this order along the circulation path, and the coolant may be caused to circulate through the first heat exchanger, the first tank, the second heat exchanger, and the junction in this order with a pump. With this structure, the junction can be situated on the circulation path at a location upstream of the first heat exchanger and downstream of the second heat exchanger.

According to a sixth aspect of the present disclosure, in the solid oxide fuel cell system according to any one of the second to fifth aspects, an ion-exchange resin filter that deionizes the coolant may be disposed on the circulation path at a location upstream of the junction and downstream of the second heat exchanger. With this structure, ions in the coolant are removed through the ion-exchange resin filter, and the coolant is supplied, as the reforming water, to the reformer from the circulation path via the first path. Consequently, catalyst poisoning in the reformer due to the ions in the coolant can be prevented. The flow rate of the coolant flowing along the circulation path is larger than the flow rate of the reforming water flowing along the first path. For this reason, even when the ion-exchange resin filter requires a predetermined flow rate or more for a filtering process, the ion-exchange resin filter can appropriately filter the coolant, which is used as the reforming water.

According to a seventh aspect of the present disclosure, the solid oxide fuel cell system according to the sixth aspect may further include a bypass path whose upstream end is connected to the circulation path at a location upstream of the ion-exchange resin filter and whose downstream end is connected to the circulation path at a location downstream of the junction. With this structure, the flow of the coolant is divided into the circulation path and the bypass path. Accordingly, the flow rate of the coolant that flows into the ion-exchange resin filter disposed on the circulation path is decreased, and a processing load can thereby be reduced.

According to an eighth aspect of the present disclosure, the solid oxide fuel cell system according to any one of the second to seventh aspects may further include a second tank that stores the reservoir water. The second heat exchanger may be disposed in the second tank so as to enable heat exchange between the coolant and the reservoir water stored in the second tank. With this structure, heat can be efficiently exchanged between the coolant and the reservoir water.

Embodiments of the present disclosure will hereinafter be described in detail with reference to the drawings. Throughout all of the drawings, like symbols designate like or corresponding components, and in the following description, a duplicative description for these components is omitted.

First Embodiment

A solid oxide fuel cell system (SOFC system) 100 according to a first embodiment will be described with reference to FIG. 1. FIG. 1 is a block diagram showing an example of the functional structure of the SOFC system 100 according to the first embodiment. The SOFC system 100 is a solid oxide fuel cell system and includes a solid oxide fuel cell (SOFC) 11, an exhaust-gas path 12, a circulation path 13, a first heat exchanger 14, a first tank 21, and a second heat exchanger 17. The SOFC system 100 may also include a first pump 19 and a second pump 20. The SOFC system 100 may further include a second tank 16, a second path 15, and an overflow path 22.

The SOFC 11 is a solid oxide fuel cell that produces electricity by using a hydrogen-containing gas and an oxidant gas. The SOFC 11 produces electricity and water by an electrochemical reaction between the hydrogen-containing gas and the oxidant gas in the presence of a catalyst. The SOFC 11 is provided with a cell (not shown), a cathode channel (not shown), and an anode channel (not shown). The hydrogen-containing gas flows through the anode channel. Air flows, as the oxidant gas, through the cathode channel from an air feeder (not shown). The hydrogen-containing gas and the air cause the electrochemical reaction in the cell, and the air cools the cell. These gases are discharged from the cell and, for example, supplied to a burner (not shown). For example, the cell is heated to a temperature of 500° C. to 1000° C., which is suitable for the catalyst.

The exhaust-gas path 12 is a path via which exhaust gas that has been discharged from the SOFC 11 flows. The exhaust-gas path 12 is connected at the upstream end thereof to the SOFC 11 and connected at the downstream end thereof to a discharge port (not shown) of the SOFC system 100, and so on. The gas (exhaust gas) that has been discharged, for example, from the burner of the SOFC 11 is discharged to the exterior of the SOFC system 100 via the exhaust-gas path 12. The temperature of the exhaust gas flowing along the exhaust-gas path 12 is, for example, 200° C.

The circulation path 13 is a path via which the coolant circulates. For example, the first heat exchanger 14, the first tank 21, and the second heat exchanger 17 in the second tank 16 are arranged in this order (referred to as normal order below) along the circulation path 13. The coolant is caused to circulate by the first pump 19 so as to pass these components 14, 21, and 17 in the normal order. The first tank 21 communicates with the circulation path 13 and constitutes part of the circulation path 13. The second tank 16 does not communicate with the circulation path 13 and is disposed separately from the circulation path 13. Water (coolant) that cools high-temperature exhaust gas in the first heat exchanger 14 flows along the circulation path 13. The coolant is water (condensed water) obtained as a result of steam in the exhaust gas being cooled and condensed in the first heat exchanger 14 and also functions as a heating medium that heats reservoir water in the second heat exchanger 17, which will be described later.

The second path 15 is a path via which the condensed water, which is produced when the exhaust gas is cooled in the first heat exchanger 14, flows. The upstream end of the second path 15 is connected, at the first heat exchanger 14 or a location downstream of the first heat exchanger 14, to the exhaust-gas path 12 (to be precise, a drain discharge port of the exhaust-gas path 12), and the second path 15 extends downward from the position of the connection with the second path. The downstream end of the second path 15 is connected to the first tank 21, which constitutes part of the circulation path 13. The condensed water flowing along the second path 15, accordingly, enters the circulation path 13 to function as the coolant.

The first tank 21 is disposed on the circulation path 13 and stores, as the coolant, the condensed water, which is produced when the exhaust gas is cooled by the coolant in the first heat exchanger 14. The first tank 21, which constitutes part of the circulation path 13, is connected to the second path 15. The first tank 21 is provided with a port through which the coolant flows into the first tank 21 and with the connection with the second path 15, below the inflow port of the overflow path 22. The first tank 21 is also provided with a port through which the coolant flows out of the first tank 21, below the port through which the coolant flows into the first tank 21 and the connection with the second path 15. In the embodiment, the port through which the coolant flows out of the first tank 21 is provided in the bottom of the first tank 21. The position of these ports, through which the coolant flows into and out of the first tank 21, is not particularly limited.

The upstream end of the overflow path 22 is connected to the first tank 21 at a predetermined height position. The first tank 21 is provided, at the predetermined height position, with an outflow port that is connected to the overflow path 22. Accordingly, the coolant in the first tank 21 enters the overflow path 22 from the outflow port connected to the overflow path 22 when the coolant has reached the predetermined height. The coolant is consequently stored in the first tank 21 up to the predetermined height position (predetermined volume). An excess coolant is discharged from the first tank 21 via the overflow path 22.

The first pump 19 is disposed on the circulation path 13 and circulates the coolant. An example of the first pump 19 is a pump suitable for high-pressure transferring such as a plunger pump. In the embodiment, the first pump 19 is disposed on the circulation path 13 at a location downstream of the first tank 21 and upstream of the second heat exchanger 17. The coolant that flows out of the first tank 21 is transferred under pressure by the first pump 19 so as to circulate on the circulation path 13.

The second tank 16 stores water (reservoir water). The second tank 16 is connected to water supply equipment (such as at a waterworks) via a water supply path 26a. Tap water is supplied, as the reservoir water, to the second tank 16 from the water supply equipment via the water supply path 26a. The second tank 16 is also connected to hot-water supply equipment (not shown) via a hot-water supply path 26b. The reservoir water heated into hot water is supplied to the hot-water supply equipment from the second tank 16 via the hot-water supply path 26b. The second tank 16 is disposed separately from the circulation path 13 (so as not to communicate with the circulation path 13). The reservoir water in the second tank 16 is different from the coolant on the circulation path 13.

The second heat exchanger 17 is disposed in the second tank 16 and on the circulation path 13 and enables heat exchange between the reservoir water and the coolant. The second heat exchanger 17 is disposed in the second tank 16 so as to enable heat exchange between the coolant and the reservoir water stored in the second tank 16. For the second heat exchanger 17, a coolant pipe 13a that is part of the circulation path 13 spirally extends and penetrates the second tank 16. For example, the reservoir water at a low temperature of 20° C. is heated by the coolant at a high temperature of 70° C., and the temperature of the reservoir water is increased to 40° C. In this way, in the second heat exchanger 17, the coolant flowing through the coolant pipe 13a (circulation path 13) functions as a medium that heats the reservoir water in the second tank 16. The coolant, on the other hand, is cooled by the reservoir water to, for example, 40° C.

The flow of water in the SOFC system 100 configured as above will next be described with reference to FIG. 1. In the SOFC system 100, when the SOFC 11 produces electricity, exhaust gas containing water that is produced due to the production of electricity is discharged via the exhaust-gas path 12. In the first heat exchanger 14, the exhaust gas on the exhaust-gas path 12 is cooled by the coolant on the circulation path 13, and the wafer in the exhaust gas is condensed, so that condensed water is produced. The condensed water flows into the first tank 21 on the circulation path 13 via the exhaust-gas path 12 and the second path 15. In the first heat exchanger 14, the coolant, on the other hand, is heated by the exhaust gas, and the heated coolant flows into the first tank 21.

Thus, the coolant heated in the first heat exchanger 14 flows into the first tank 21 and the condensed water produced in the first heat exchanger 14 also flows, as the coolant, into the first tank 21. When the height of the coolant that has been stored reaches the predetermined height in the first tank 21, the coolant is discharged via the overflow path 22. The coolant in the first tank 21 is transferred under pressure by the first pump 19 to the second heat exchanger 17 via the circulation path 13.

In the second heat exchanger 17, the reservoir water in the second tank 16 is heated by the coolant on the circulation path 13. The reservoir water thus heated is stored in the second tank 16 and, if necessary, supplied to the hot-water supply equipment via the hot-water supply path 26b. When the amount of the reservoir water in the second tank 16 is decreased in such a manner, water (tap water) is supplied to the second tank 16 from the water supply equipment via the water supply path 26a. In the second heat exchanger 17, the coolant, on the other hand, is cooled by the reservoir water, and the cooled coolant flows out to the circulation path 13.

In the SOFC system 100 configured as above, the first heat exchanger 14 exchanges heat between the coolant on the circulation path 13 and the exhaust gas on the exhaust-gas path 12. The circulation path 13 is disposed separately from the second tank 16, which stores the reservoir water (so as not to communicate with the second tank 16). Accordingly, the reservoir water, which is composed mainly of tap water, is not used as the coolant. For this reason, metal ions contained in the tap water are not heated by the high-temperature exhaust gas, unlike the related art in which tap water is used as a coolant. The occurrence of scale due to metal ions can thereby be prevented, and, in the first heat exchanger 14, a reduction in the heat-exchange efficiency due to the scale can be prevented. In addition, it is unnecessary to use an expensive component that prevents the attachment of scale, thereby an increase in cost can be suppressed.

The first heat exchanger 14 and the second heat exchanger 17 are disposed on the circulation path 13. Accordingly, the low-temperature coolant cooled by the reservoir water in the second heat exchanger 17 is used to cool the exhaust gas in the first heat exchanger 14. The exhaust gas can thereby be sufficiently cooled by the low-temperature coolant, so that steam in the exhaust gas can be condensed.

The second path 15 via which the condensed water flows is connected to the circulation path 13. Accordingly, the condensed water is supplied, as the coolant, to the circulation path 13 via the second path 15. A shortage of the coolant on the circulation path 13 can thereby be avoided. In addition, it is unnecessary to add tap water as the coolant, and the occurrence of scale due to metal ions in tap water can be prevented.

The first tank 21 is connected to the overflow path 22. Accordingly, an excess coolant that is above the inflow port of the overflow path 22 is discharged from the first tank 21 via the overflow path 22. The coolant can thereby be prevented from overflowing from the first tank 21 and from flowing back into, for example, the exhaust-gas path 12.

Second Embodiment

Figure 2:
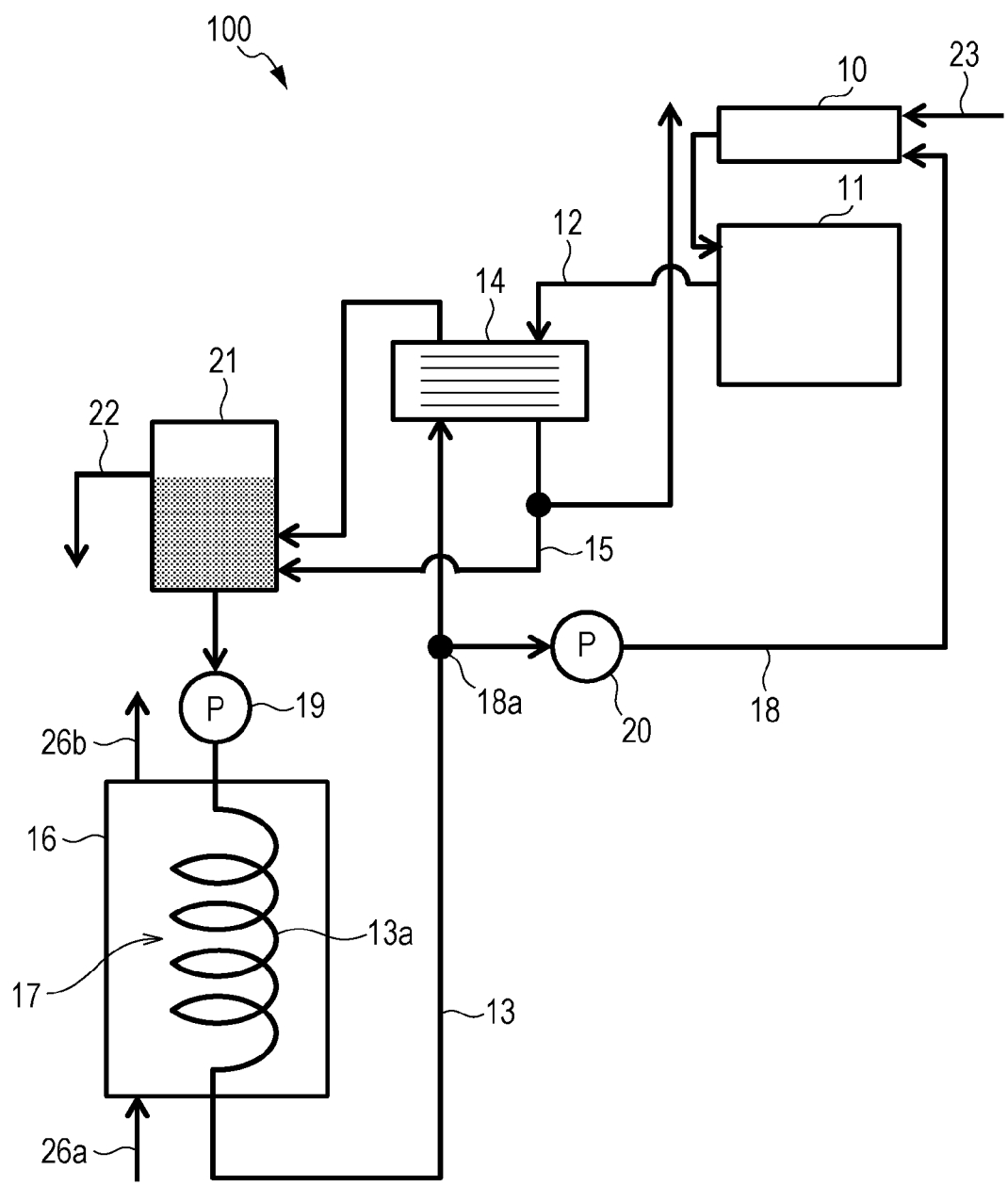
FIG. 2 is a schematic diagram of the structure of a solid oxide fuel cell system according to a second embodiment.

An SOFC system 100 according to a second embodiment will be described with reference to FIG. 2. FIG. 2 is a block diagram showing an example of the functional structure of the SOFC system 100 according to the second embodiment. The SOFC system 100 further includes a reformer 10 and a first path 18, in addition to the structure in FIG. 1.

The reformer 10 is a reactor that produces a hydrogen-containing gas by using a source and water (reforming water). The reformer 10 causes a reforming reaction between the source and steam in the presence of a catalyst, producing the hydrogen-containing gas. The reformer 10 is heated to a temperature suitable for the catalyst, for example, a temperature of 600° C. to 700° C. The reformer 10 is provided with an evaporator (not shown), which produces steam from the reforming water supplied via the first path 18. The source is supplied from a source supplier (not shown) to the reformer 10 via a supply path 23. The source is a gas containing an organic compound including carbon and hydrogen such as town gas including methane as a primary component, natural gas, or liquefied petroleum gas (LPG). The source supplier can adjust the flow rate of the source gas. Examples of the source supplier include a booster, a flow-rate adjusting valve, a combination thereof, and a fixed displacement pump.

The SOFC 11 produces electricity and water by an electrochemical reaction between the hydrogen-containing gas and the oxidant gas in the presence of the catalyst. The hydrogen-containing gas flows through the anode channel from the reformer 10. The gas flowing through the anode channel and the cathode channel is discharged from the cell and supplied to, for example, a burner (not shown). The burner heats the cell and the reformer 10. For example, the cell is heated to a temperature of 500° C. to 1000° C., which is suitable for the catalyst.

The first path 18 branches from the circulation path 13 at a junction 18a and is a path via which the coolant flows, as the reforming water, to the reformer 10. The junction 18a is situated on the circulation path 13 at a location upstream of the first heat exchanger 14 and downstream of the second heat exchanger 17. The downstream end of the first path 18 is connected to the reformer 10. Some of the coolant, accordingly, enters the first path 18 at the junction 18a after passing the second heat exchanger 17. The other coolant passes the second heat exchanger 17 and the junction 18a and flows into the first heat exchanger 14.

The second pump 20 is disposed on the first path 18 and adjusts the flow rate of the reforming water to cause the reforming water to flow into the reformer. An example of the second pump 20 is a fixed displacement pump such as a plunger pump. The second pump 20 adjusts the flow rate of the reforming water flowing along the first path 18 such that, in the reformer 10, a mole ratio (S/C ratio) of the reforming water to carbon in the source is, for example, 2.5 to 3.5. The flow rate of the reforming water is much lower than the flow rate of the coolant, for example, 5% of the flow rate of the coolant flowing along the circulation path 13 at a location upstream of the junction 18a.

Some of the coolant enters the first path 18 from the junction 18a and is supplied to the reformer 10. The flow rate of the coolant supplied to the reformer 10 is adjusted by the second pump 20 in accordance with the S/C ratio. The other coolant passes the junction 18a and flows into the first heat exchanger 14, at which heat is exchanged between the coolant and the exhaust gas, as described above.

The first path 18 branches from the circulation path 13 and is connected to the reformer 10. Accordingly, part of the circulation path 13 via which the coolant flows is used as a path via which the reforming water flows. The path shared between the coolant and the reforming water in this way enables a reduction in the size and the cost.

The junction 18a of the first path 18 is situated downstream of the second heat exchanger 17 and upstream of the first heat exchanger 14. For this reason, the coolant, before being heated by the exhaust gas in the first heat exchanger 14 and after being cooled by the reservoir water in the second heat exchanger 17, enters the first path 18 from the junction 18a. It is accordingly unnecessary to use an expensive pump having high heat resistance as, for example, the second pump 20 on the first path 18, thereby an increase in cost can be suppressed.

The second path 15 via which the condensed water flows is connected to the circulation path 13. Accordingly, the condensed water is supplied, as the coolant, to the circulation path 13 via the second path 15. Consequently, a shortage of the coolant on the circulation path 13 and a shortage of the reforming water on the first path 18, which branches from the circulation path 13, can be avoided. In addition, it is unnecessary to add tap water as the coolant and as the reforming water, and the occurrence of scale due to metal ions in tap water can be prevented.

Third Embodiment

Figure 3:
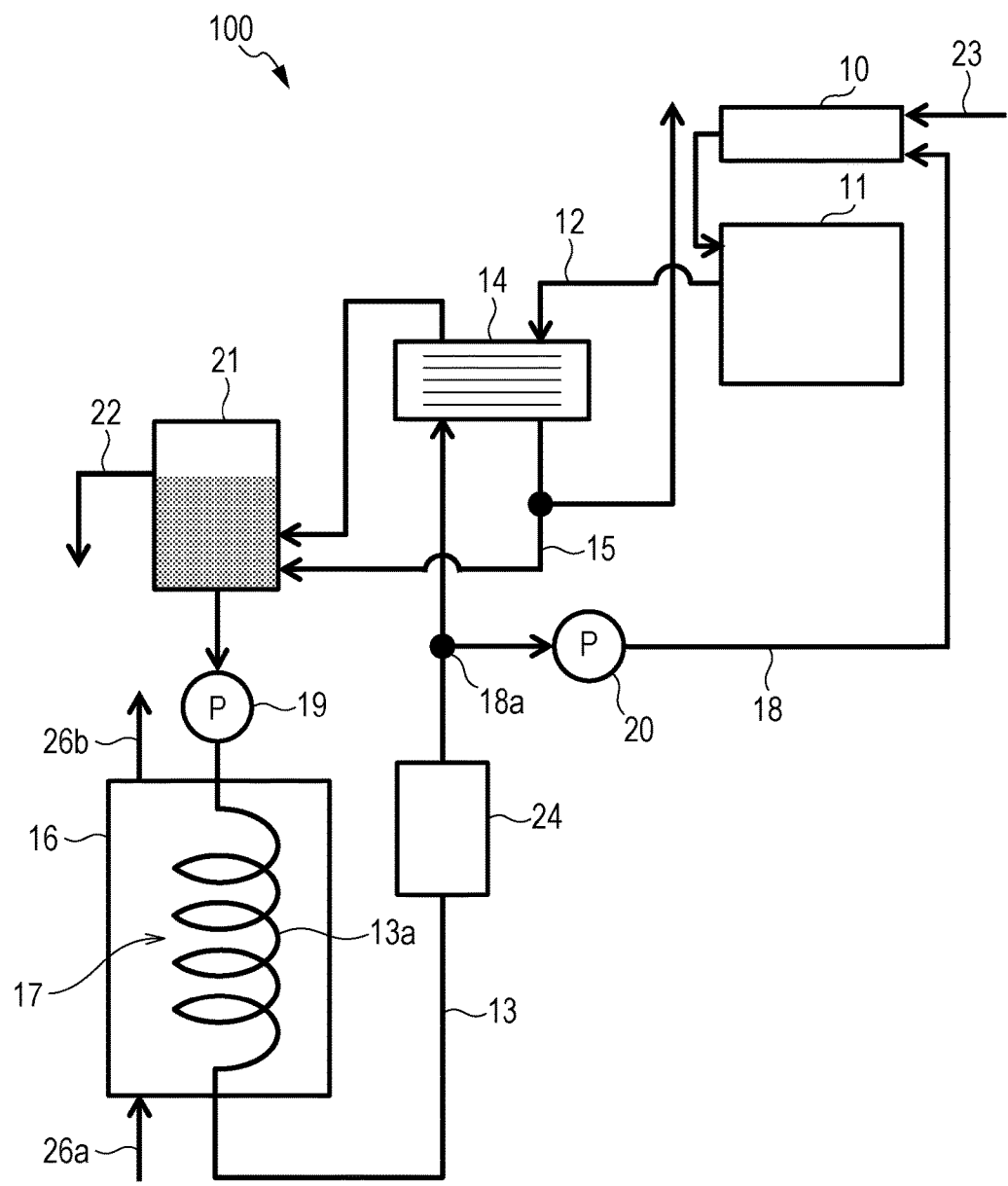
FIG. 3 is a schematic diagram of the structure of a solid oxide fuel cell system according to a third embodiment.

An SOFC system 100 according to a third embodiment will be described with reference to FIG. 3. FIG. 3 is a block diagram showing an example of the functional structure of the SOFC system 100 according to the third embodiment. The SOFC system 100 further includes an ion-exchange resin filter 24, in addition to the structure in FIG. 2.

The ion-exchange resin filter 24 removes ions from the coolant (deionizes the coolant). The ions to be removed are mainly ions that cause catalyst poisoning in the reformer 10 and the SOFC 11. The ion-exchange resin filter 24 is disposed on the circulation path 13 at a location upstream of the junction 18a of the first path 18 and downstream of the second heat exchanger 17. A preferable position of the ion-exchange resin filter 24 is nearer the junction 18*a* of the first path 18.

Water flow in the SOFC system 100 configured as above is such that exhaust gas containing water is cooled by the coolant on the circulation path 13 in the first heat exchanger 14. The water in the exhaust gas is condensed in this way, so that condensed water is produced. The condensed water flows, as the coolant, into the first tank 21 on the circulation path 13 via the exhaust-gas path 12 and the second path 15. In addition, the coolant heated by the exhaust gas in the first heat exchanger 14 flows into the first tank 21. The coolant in the first tank 21 is transferred under pressure by the first pump 19 to the second heat exchanger 17 via the circulation path 13. In the second heat exchanger 17, the coolant is cooled to a low temperature by the reservoir water in the second tank 16 and then flows into the ion-exchange resin filter 24. The ion-exchange resin filter 24 removes ions from the coolant. Some of the coolant is supplied to the reformer 10 via the first path 18, and the other coolant flows into the first heat exchanger 14 via the circulation path 13.

In the SOFC system 100 configured as above, the ion-exchange resin filter 24 is disposed on the circulation path 13. The coolant flowing along the circulation path 13 is not only the coolant used as the reforming water but also the coolant used as the heating medium in the first heat exchanger 14 and the second heat exchanger 17. Accordingly, the flow rate of the reforming water flowing along the first path 18 is very low, and the flow rate of the coolant flowing along the circulation path 13 is larger than the flow rate of the reforming water. For this reason, even when the ion-exchange resin filter 24 requires a predetermined flow rate for a filtering process, the ion-exchange resin filter 24 can more reliably filter the coolant.

The ion-exchange resin filter 24 is disposed on the circulation path 13 at a location downstream of the second heat exchanger 17. Accordingly, the low-temperature coolant cooled by the reservoir water in the second heat exchanger 17 flows into the ion-exchange resin filter 24. The ion-exchange resin filter 24 can thereby be prevented from deteriorating due to heat from the coolant. In addition, it is unnecessary to use the ion-exchange resin filter 24 with high heat resistance at high cost, thereby an increase in cost can be suppressed.

When the coolant is not sufficiently cooled by the reservoir water such as in the case where the temperature of the reservoir water is high, a heat dissipation device (not shown) may be provided to cool the coolant. The heat dissipation device may be a radiator and is provided on the circulation path 13 at a location upstream of the ion-exchange resin filter 24.

The ion-exchange resin filter 24 is provided on the circulation path 13 at a location upstream of the junction 18*a* of the first path 18. Accordingly, the coolant deionized by the ion-exchange resin filter 24 is supplied from the junction 18*a* to the reformer 10 via the first path 18. The catalysts in the reformer 10 and the SOFC 11 connected to the reformer 10 can thereby be prevented from being poisoned by ions in the coolant.

A preferable position of the ion-exchange resin filter 24 is nearer the junction 18*a* of the first path 18. More specifically, with the result that the distance between the ion-exchange resin filter 24 and the junction 18*a* is decreased as the ion-exchange resin filter 24 is nearer the junction 18*a*, the amount of added ions can be decreased over the above distance. A coolant containing fewer ions can consequently be supplied, as the reforming water, to the reformer 10.

Even though the coolant is contaminated at the downstream end of the overflow path 22 that is exposed to air, the coolant is supplied to the reformer 10 via the first path 18 after being filtered through the ion-exchange resin filter 24. The reformer 10 can thereby be more reliably prevented from deteriorating due to the contaminated coolant.

Fourth Embodiment

Figure 4:
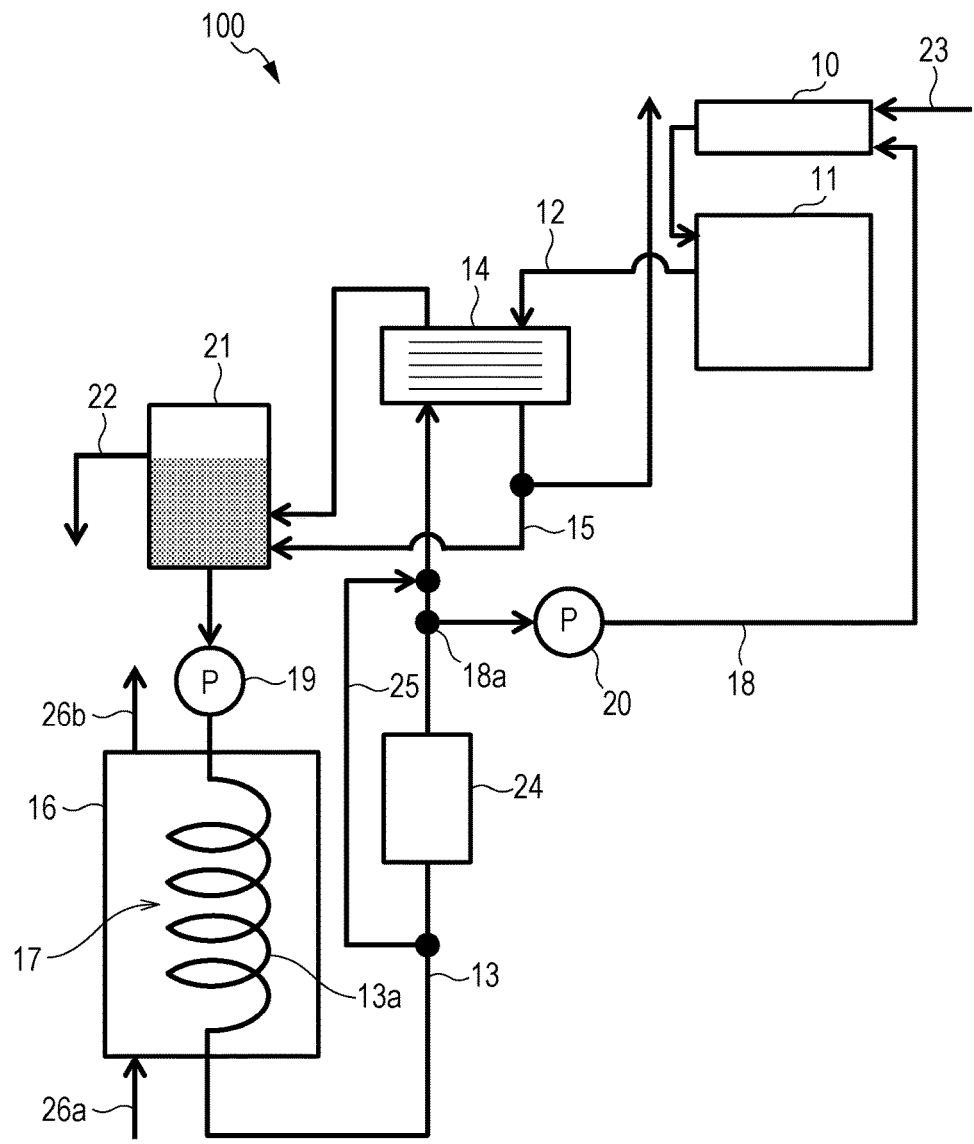
FIG. 4 is a schematic diagram of the structure of a solid oxide fuel cell system according to a fourth embodiment.

An SOFC system 100 according to a fourth embodiment will be described with reference to FIG. 4. FIG. 4 is a block diagram showing an example of the functional structure of the SOFC system 100 according to the fourth embodiment. The SOFC system 100 further includes a bypass path 25, in addition to the structure in FIG. 3.

The bypass path 25 is a path that enables the ion-exchange resin filter 24 and the junction 18*a* of the first path 18 to be bypassed. The bypass path 25 is connected at the upstream end thereof to the circulation path 13 at a location upstream of the ion-exchange resin filter 24 and connected at the lower end thereof to the circulation path 13 at a location downstream of the junction 18a. The upstream end of the bypass path 25 is preferably situated on the circulation path 13 at a location upstream of the ion-exchange resin filter 24 and downstream of the second heat exchanger 17. The downstream end of the bypass path 25 is preferably situated on the circulation path 13 at a location downstream of the junction 18*a* of the first path 18 and upstream of the first heat exchanger 14. The diameter of the bypass path 25 is determined such that the flow rate of the reforming water is sufficient for the reforming reaction, for example, in accordance with the S/C ratio, and such that the flow rate is sufficient for the filtering process of the ion-exchange resin filter 24.

Water flow in the SOFC system 100 configured as above is such that exhaust gas containing water is cooled by the coolant on the circulation path 13 in the first heat exchanger 14. The condensed water produced from the water in the exhaust gas in this way flows, as the coolant, into the first tank 21 on the circulation path 13 via the exhaust-gas path 12 and the second path 15. In addition, the coolant heated by the exhaust gas in the first heat exchanger 14 flows into the first tank 21. The coolant is transferred by the first pump 19 from the first tank 21 to the second heat exchanger 17 via the circulation path 13. In the second heat exchanger 17, the coolant is cooled to a low temperature by the reservoir water in the second tank 16. Some of the coolant flows into the ion-exchange resin filter 24 via the circulation path 13. After ions in the coolant are removed through the ion-exchange resin filter 24, the coolant is supplied from the junction 18*a* to the reformer 10 via the first path 18. The other coolant enters the bypass path 25 from the circulation path 13 at a location upstream of the ion-exchange resin filter 24, returns from the bypass path 25 to the circulation path 13 at a location downstream of the junction 18*a* of the first path 18, and flows into the first heat exchanger 14.

In the SOFC system 100 configured as above, the bypass path 25 that enables the ion-exchange resin filter 24 and the junction 18*a* of the first path 18 to be bypassed is provided. Accordingly, at a location upstream of the ion-exchange resin filter 24, the coolant is separated into the coolant that enters the bypass path 25 and the coolant that flows into the ion-exchange resin filter 24 via the circulation path 13. Consequently, the flow rate of the coolant filtered through the ion-exchange resin filter 24 can be decreased, thereby the processing load can be reduced.

A valve may be provided at a position at which the upstream end of the bypass path 25 is connected to the circulation path 13. This valve can adjust the flow rate of the coolant that enters the bypass path 25 by the degree of opening. The diameter of the bypass path 25 may be the same as the diameter that the circulation path 13 has at a location upstream of the position at which the upstream end of the bypass path 25 is connected to the circulation path 13. For example, right after the production of electricity is stopped, the temperature of the exhaust gas is high, and it is accordingly necessary to cool the exhaust gas by using the coolant in order to discharge the exhaust gas to the exterior of the SOFC system 100, whereas it is unnecessary to supply the reforming water. In such a case, the flow of the coolant on the first path 18 is unnecessary. For this reason, the valve is opened wide such that all of the coolant, which flows along the circulation path 13 at a location upstream of the position at which the upstream end of the bypass path 25 is connected to the circulation path 13, enters the bypass path 25. This eliminates an unnecessary filtering process of the ion-exchange resin filter 24, thereby the processing load can be reduced. In addition, the coolant does not enter the first path 18 from the circulation path 13, and the exhaust gas can thereby be efficiently cooled.

Other Embodiments

Throughout the embodiments, for the second heat exchanger 17, the circulation path 13 spirally extends and penetrates the second tank 16. The second heat exchanger 17, however, is not limited thereto, provided that heat can be exchanged between the reservoir water in the second tank and the coolant on the circulation path 13 at the second tank. For example, the circulation path 13 may be wound around the second tank 16 so as to surround the second tank 16. Alternatively, a reservoir-water channel passing through the second tank 16 may be formed, and heat may be exchanged between the coolant and reservoir water flowing through the reservoir-water channel.

Throughout the embodiments, the downstream end of the second path 15 is connected to the first tank 21. The embodiments, however, are not limited to this structure, provided that the condensed water flowing along the second path 15 enters the circulation path 13. For example, the downstream end of the second path 15 may be connected to the circulation path 13.

Throughout the embodiments, the ion-exchange resin filter 24 is disposed on the circulation path 13 at a location upstream of the junction 18a of the first path 18 and downstream of the second heat exchanger 17. The position of the ion-exchange resin filter 24, however, is not limited to this position, provided that the coolant supplied as the reforming water can be deionized. For example, the ion-exchange resin filter 24 may be disposed on the second path 15, in the first tank 21, on the first path 18, or on the circulation path 13 except at locations upstream of the junction 18a of the first path 18 and downstream of the second heat exchanger 17. When the ion-exchange resin filter 24 is disposed, for example, on the first path 18, the distance between the ion-exchange resin filter 24 and the reformer 10 is decreased. Accordingly, added ions can be decreased over the above distance, and the reforming water containing fewer ions can be supplied to the reformer 10.

The solid oxide fuel cell system according to the present disclosure can be used as, for example, a solid oxide fuel cell system that can reduce both the cost and the size while preventing a reduction in the heat-exchange efficiency.

What is claimed is:

1. A solid oxide fuel cell system comprising:
a solid oxide fuel cell that produces electricity by using a hydrogen-containing gas and an oxidant gas;
an exhaust-gas path via which an exhaust gas discharged from the solid oxide fuel cell flows;
a loop circulation path via which a cooling water circulates;
a first heat exchanger that is disposed on the exhaust-gas path and the loop circulation path and enables heat exchange between the exhaust gas and the cooling water;
a first tank that is disposed on the loop circulation path and stores, as the cooling water, condensed water produced when the exhaust gas is cooled by the cooling water in the first heat exchanger; and
a second heat exchanger that is disposed so as to enable heat exchange between the cooling water and a reservoir water,
wherein the second heat exchanger is disposed between the first tank and the first heat exchanger so as to enable heat exchange between the cooling water output from the first tank and the reservoir water before the cooling water is input to the first heat exchanger.

2. The solid oxide fuel cell system according to claim 1, further comprising:
a reformer that produces the hydrogen-containing gas by using a source and reforming water; and
a first path via which the cooling water flows, as the reforming water, into the reformer, the first path branching from the loop circulation path at a junction.

3. The solid oxide fuel cell system according to claim 2, further comprising:
a first pump that is disposed on the loop circulation path and circulates the cooling water; and
a second pump that is disposed on the first path and adjusts a flow rate of the reforming water to cause the reforming water to flow into the reformer.

4. The solid oxide fuel cell system according to claim 2, wherein the junction is situated on the loop circulation path at a location upstream of the first heat exchanger and downstream of the second heat exchanger.

5. The solid oxide fuel cell system according to claim 4, wherein the first heat exchanger, the first tank, the second heat exchanger, and the junction are arranged in this order along the loop circulation path, and
wherein the cooling water is caused to circulate through the first heat exchanger, the first tank, the second heat exchanger, and the junction in this order with a pump.

6. The solid oxide fuel cell system according to claim 2, wherein an ion-exchange resin filter that deionizes the cooling water is disposed on the loop circulation path at a location upstream of the junction and downstream of the second heat exchanger.

7. The solid oxide fuel cell system according to claim 6, further comprising:
a bypass path whose upstream end is connected to the loop circulation path at a location upstream of the ion-exchange resin filter and whose downstream end is connected to the loop circulation path at a location downstream of the junction.

8. The solid oxide fuel cell system according to claim 2, further comprising:
a second tank that stores the reservoir water,
wherein the second heat exchanger is disposed in the second tank so as to enable heat exchange between the cooling water and the reservoir water stored in the second tank.

9. The solid oxide fuel cell system according to claim 1, wherein the loop circulation path is configured so that the cooling water flows from the first tank and flows back to the first tank.

\* \* \* \* \*